US010953251B1

(12) United States Patent
Valenzuela

(10) Patent No.: US 10,953,251 B1
(45) Date of Patent: Mar. 23, 2021

(54) FIREFIGHTING VALVE ASSEMBLIES, HOSE LAYS, HOSE PACKS, AND METHODS OF USING SAME

(71) Applicant: Troy Valenzuela, Carson City, NV (US)

(72) Inventor: Troy Valenzuela, Carson City, NV (US)

( * ) Notice: Subject to any disclaimer, the term of this patent is extended or adjusted under 35 U.S.C. 154(b) by 0 days.

(21) Appl. No.: 16/660,697

(22) Filed: Oct. 22, 2019

Related U.S. Application Data

(60) Provisional application No. 62/748,971, filed on Oct. 22, 2018.

(51) Int. Cl.
| | | |
|---|---|---|
| *A62C 31/28* | (2006.01) | |
| *F16K 5/06* | (2006.01) | |
| *F16K 31/60* | (2006.01) | |
| *F16K 31/50* | (2006.01) | |
| *F16K 11/20* | (2006.01) | |
| *B05B 12/00* | (2018.01) | |
| *A62C 33/04* | (2006.01) | |
| *B05B 1/30* | (2006.01) | |

(52) U.S. Cl.
CPC ............ *A62C 31/28* (2013.01); *F16K 5/0647* (2013.01); *F16K 11/205* (2013.01); *F16K 31/50* (2013.01); *F16K 31/60* (2013.01); *A62C 33/04* (2013.01); *B05B 1/3026* (2013.01); *B05B 12/002* (2013.01)

(58) Field of Classification Search
CPC ....... A62C 3/0292; A62C 31/28; A62C 33/00; A62C 33/04; F16K 5/06; F16K 5/0647; F16K 5/20; F16K 11/205; F16K 11/22; F16K 31/50; F16K 31/60; B05B 1/3026; B05B 12/002

See application file for complete search history.

(56) References Cited

U.S. PATENT DOCUMENTS

| | | | | |
|---|---|---|---|---|
| 5,579,966 A | * | 12/1996 | Krumweide | A45F 3/08 224/259 |
| 7,255,131 B2 | * | 8/2007 | Paper | F16K 5/06 137/625.47 |
| 7,647,944 B1 | * | 1/2010 | Howerton | F16K 11/205 137/886 |
| 2005/0067032 A1 | * | 3/2005 | Huang | F16K 11/205 137/881 |
| 2006/0255187 A1 | * | 11/2006 | Rust | F16K 5/0605 239/548 |
| 2014/0110616 A1 | * | 4/2014 | Freeth | F16K 31/60 251/288 |

(Continued)

OTHER PUBLICATIONS

Gizmo Shutoff, Cascade Fire Equipment, 2018 (2 pp.).

(Continued)

*Primary Examiner* — Darren W Gorman
(74) *Attorney, Agent, or Firm* — Holland & Hart LLP

(57) ABSTRACT

Various implementations of a firefighting valve assembly are disclosed. The firefighting valve assembly is especially suitable for fighting wildland fires. In some implementation, the firefighting valve assembly has a spatial profile that makes it easy to pack with long bundles of firefighting hose and easy to connect segments of firefighting hose as part of a hose lay. In some implementations, the firefighting valve assembly has a spatial profile that prevents it from inadvertently opening or closing when the hose is moved or pulled along the ground.

21 Claims, 10 Drawing Sheets

(56) References Cited

U.S. PATENT DOCUMENTS

2017/0151452 A1\* 6/2017 Kim ...................... A62C 33/06

OTHER PUBLICATIONS

Water Handling Equipment Guide, National Wildfire Coordinating Group, Oct. 2003 (251 pp.).
Water Handling Equipment Guide, National Wildfire Coordinating Group, Jun. 2013 (154 pp.).
Wildland Hoselays, GBEA 2009 (4 pp.).

\* cited by examiner

FIREFIGHTING VALVE ASSEMBLIES, HOSE LAYS, HOSE PACKS, AND METHODS OF USING SAME

TECHNICAL FIELD

This relates to valve assemblies used to fight fires. It is especially related to valve assemblies used to fight wildland fires, connect wildland hose lays, and equip wildland hose packs.

BACKGROUND OF SOME ASPECTS OF THIS SPECIFICATION

Conventional methods used to selectively shutoff the flow in a wildland firefighting hose use hose shutoff clamps having two-piece jaws that are operated with a lever arm. They clamp the hose to shut off the water when a hose bursts, to change a nozzle, add or remove hoses, and the like.

Another conventional method involves the use of a gated wye device. It includes two ball valves embodied in a "Y" design, but it is susceptible to being inadvertently opened or closed due during use due to the handles extending outward from the device and catching on the ground or other object. Also, the gated wye is not compatible with many hose packs designs due to its large size and extended handles.

SUMMARY OF SOME ASPECTS OF THIS SPECIFICATION

A firefighting valve assembly is described that can be used to fight wildland fires. In some implementations, the firefighting valve assembly includes a valve body having an inlet, an outlet, and a passage extending between the inlet and the outlet. It can also include a valve having a knob movable between an open position where the passage is open and a closed position where the passage is closed.

In some implementations, the valve assembly can move between an open position and a closed position without appreciably changing its spatial profile. The static profile of the valve assembly contrasts with the extended handles of conventional designs where the profile changes significantly when the valve is moved between an open and closed position. The static profile minimizes the risk of the valve assembly inadvertently changing state during use. It also makes it easy to incorporate into hose packs and the like.

The systems, methods, and devices of this disclosure each have several innovative aspects, no single one of which is solely responsible for the described desirable attributes. The summary is provided to introduce a selection of concepts in a simplified form that are further described below in the detailed description. The summary and the background are not intended to identify key concepts or essential aspects of the disclosed subject matter, nor should they be used to constrict or limit the scope of the claims. For example, the scope of the claims should not be limited based on whether the recited subject matter includes any or all aspects noted in the summary and/or addresses any of the issues noted in the background.

BRIEF DESCRIPTION OF THE DRAWINGS

The preferred and other implementations are disclosed in association with the accompanying drawings in which.

DETAILED DESCRIPTION

Figure 1:
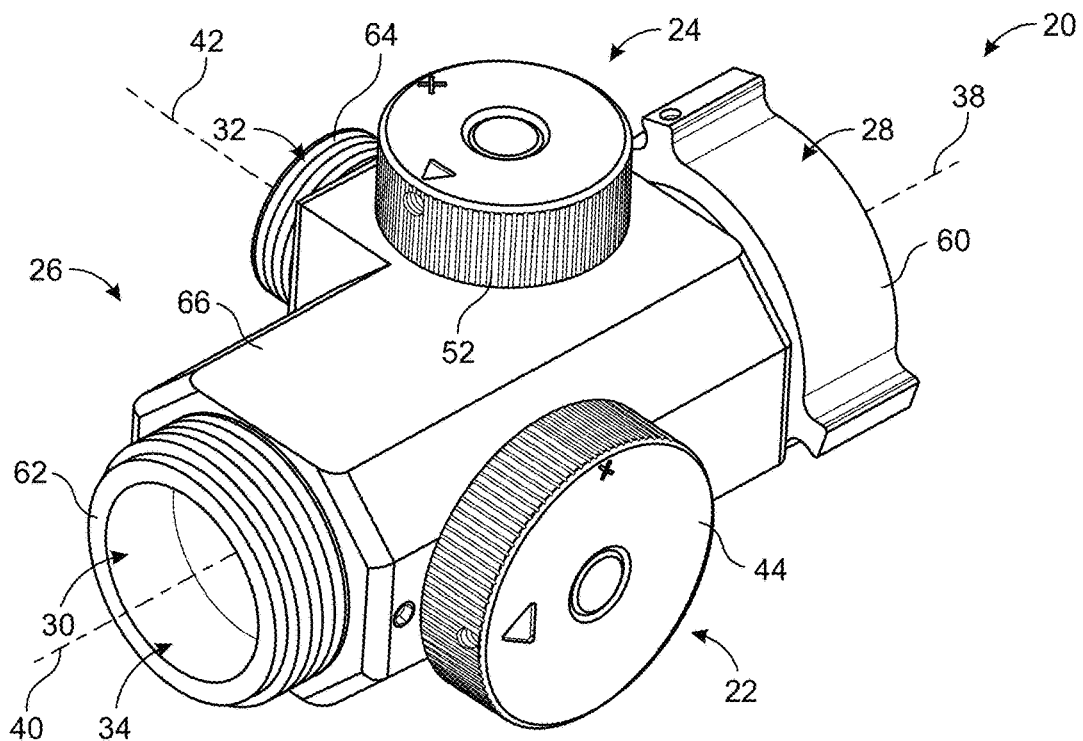
FIG. 1 is a top perspective view of one implementation of a firefighting valve assembly.

FIG. 1 shows one implementation of a firefighting valve assembly 20 that can be used to join one or more firefighting hoses. In some implementations, the valve assembly 20 can be used to join sections of firefighting hose to form a firefighting hose lay. In some implementations, the valve assembly 20 can be coupled to the end of a section of firefighting hose in a firefighting hose pack. The valve assembly 20 is especially suitable for use in fighting wildland wildfires.

It should be appreciated that the valve assembly 20 can be any suitable size and have any suitable configuration. In general, it is desirable for the valve assembly to have an in-line spatial profile with the firefighting hose. This makes it easier to transport and use compared to conventional valves having outward extending valve handles that make them difficult to pack and susceptible to being inadvertently opened or closed. The in-line profile helps prevent the valve assembly 20 from inadvertently or unintentionally opening or closing when it is moved on the ground as part of fighting the fire.

In some implementations, the valve assembly 20 is configured to be attached to 1-inch and/or 1.5-inch firefighting hoses, which are often used to fight wildland wildfires. For example, the valve assembly 20 can include threads having a thread pitch that is within the tolerances for National Standard Thread (NST) for 1-inch and 1.5-inch connections.

The valve assembly 20 can be made of any suitable material including metal, plastic, composites, and the like. In some implementations, the valve assembly is constructed primarily or entirely from aluminum. This makes the valve assembly 20 lightweight, which is significant for firefighters who must carry equipment to the source of a fire. This also makes the valve assembly 20 rugged and strong. In some implementations, the valve assembly 20 is no more than 4 pounds, no more than 3.5 pounds, no more than 3 pounds, or no more than 2.75 pounds. For example, the valve assembly 20 can be approximately 2.5 pounds.

The valve assembly 20 includes a main valve 22 (alternatively referred to as a first valve or main line valve), a branch valve 24 (alternatively referred to as a second valve or branch line valve), a valve body 26. The valve body 26 includes a main inlet 28, a main outlet 30, and a branch outlet 32. The valve body 26 also defines a main passage 34 extending between the main inlet 28 and the main outlet 30 and a branch passage 36 extending between the main passage 34 and the branch outlet 32.

Figure 2:
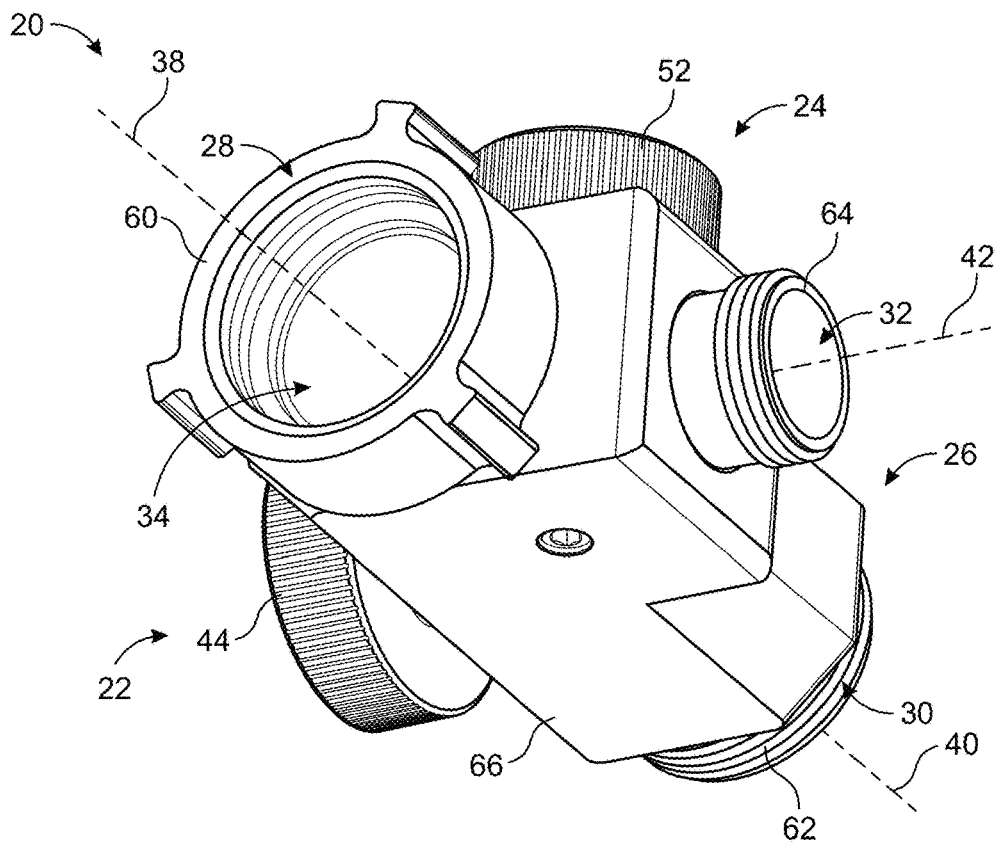
FIG. 2 is a bottom perspective view of the firefighting valve assembly in FIG. 1.
Figure 3:
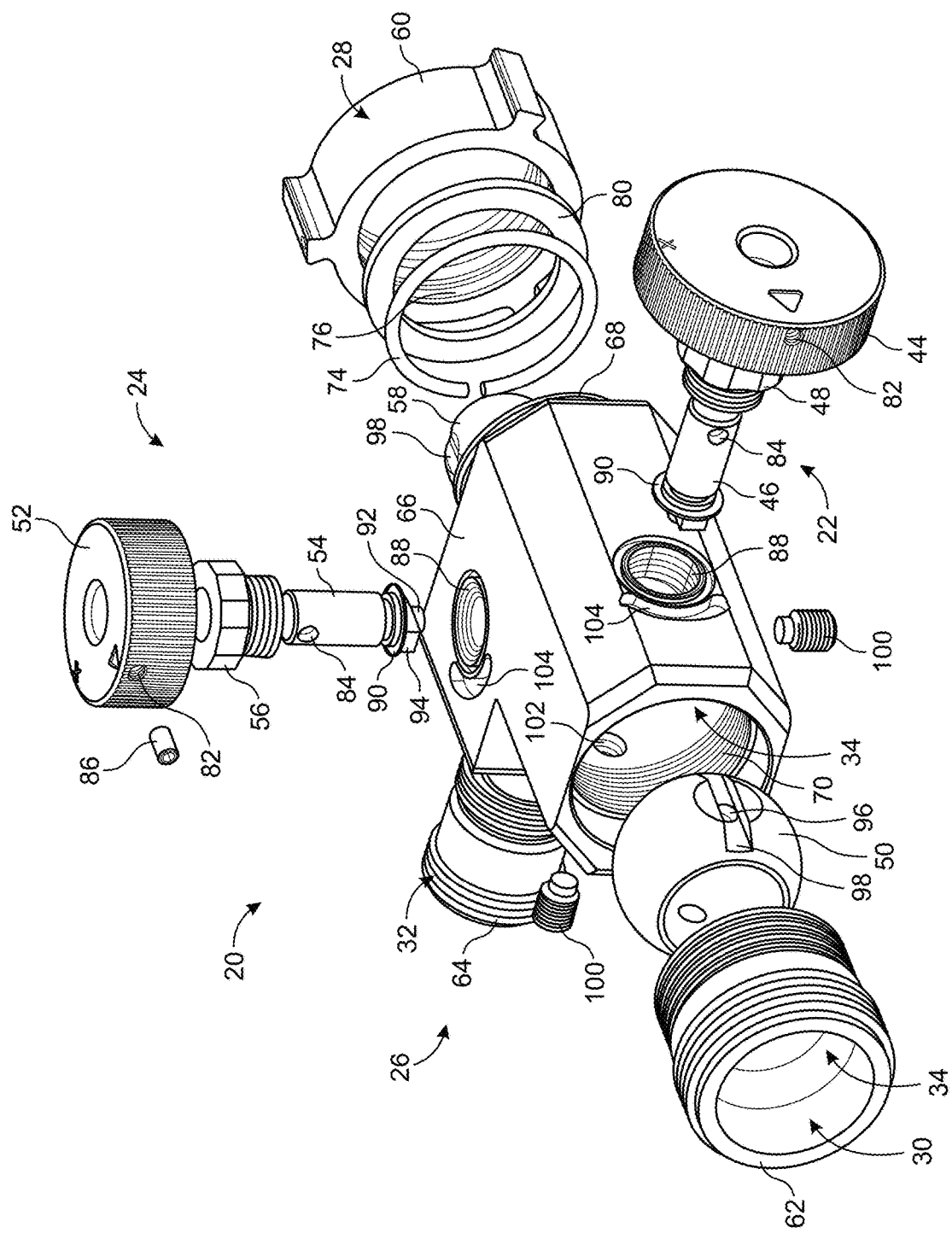
FIG. 3 is a top exploded perspective view of the firefighting valve assembly in FIG. 1. The view is from the male coupling end to the opposite positioned female coupling end.
Figure 4:
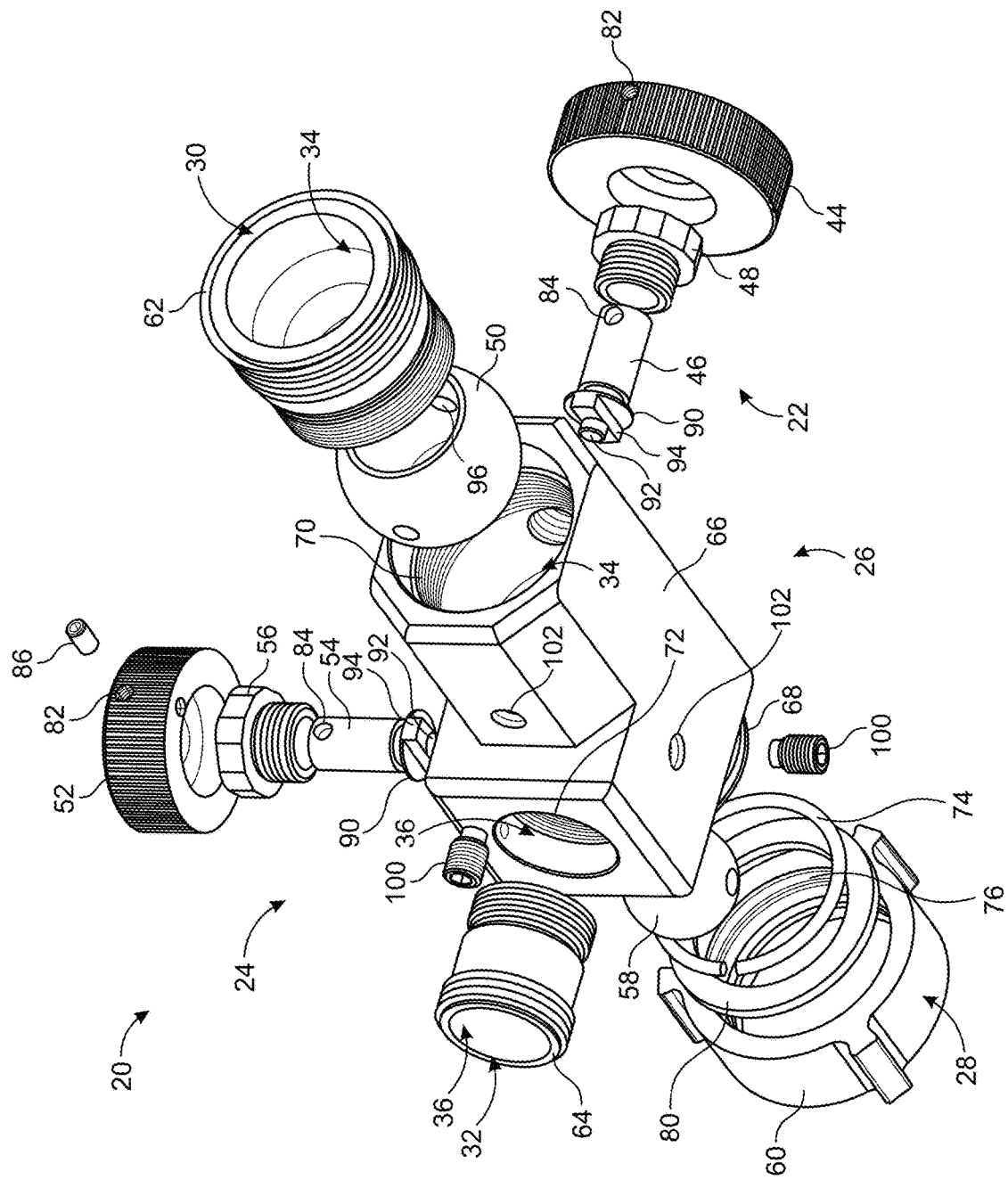
FIG. 4 is a bottom exploded perspective view of the firefighting valve assembly in FIG. 1 from the same view as FIG. 3.
Figure 5:
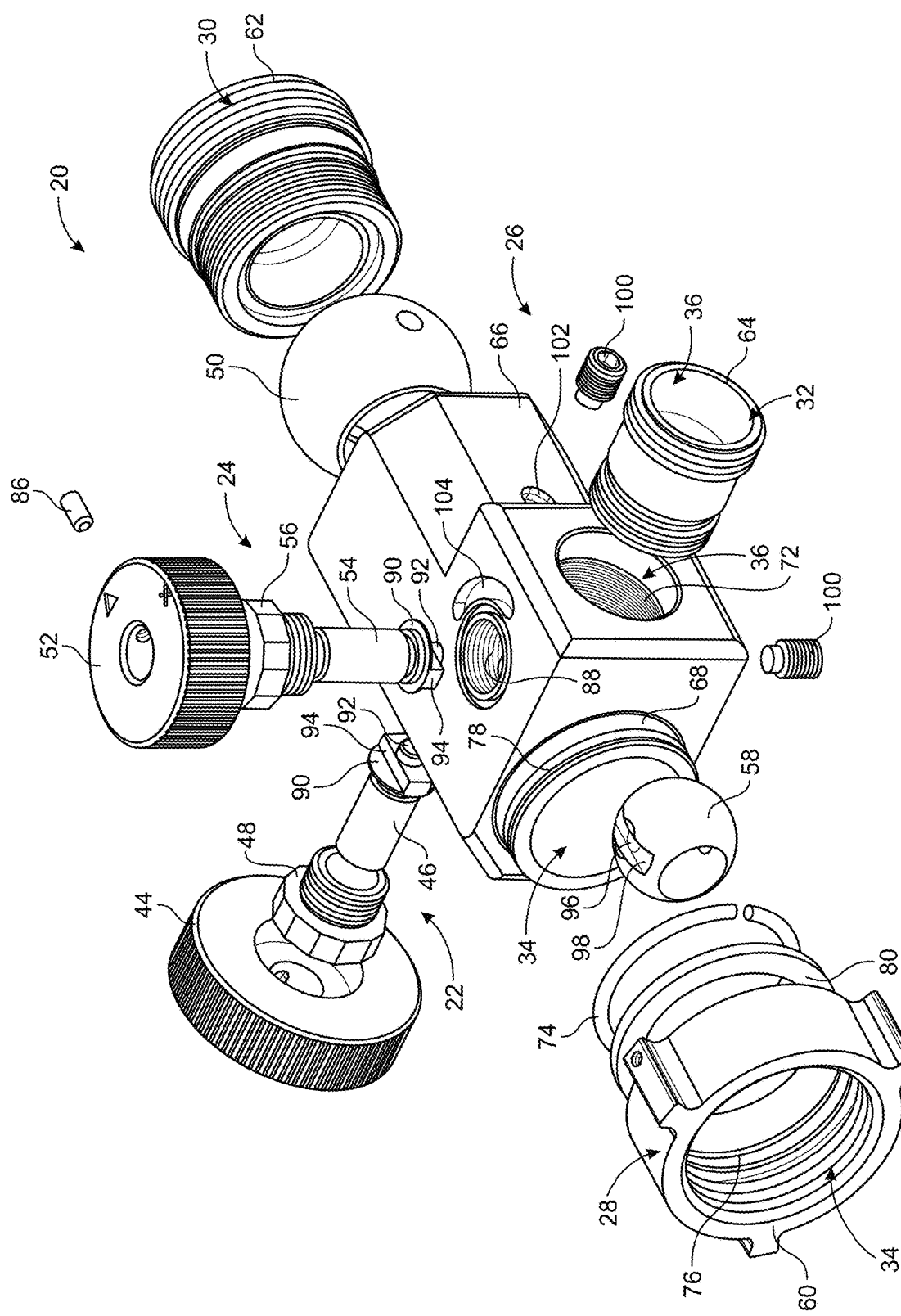
FIG. 5 is a top exploded perspective view of the firefighting valve assembly in FIG. 1. The view is from the female coupling end to the opposite positioned mail coupling end.
Figure 6:
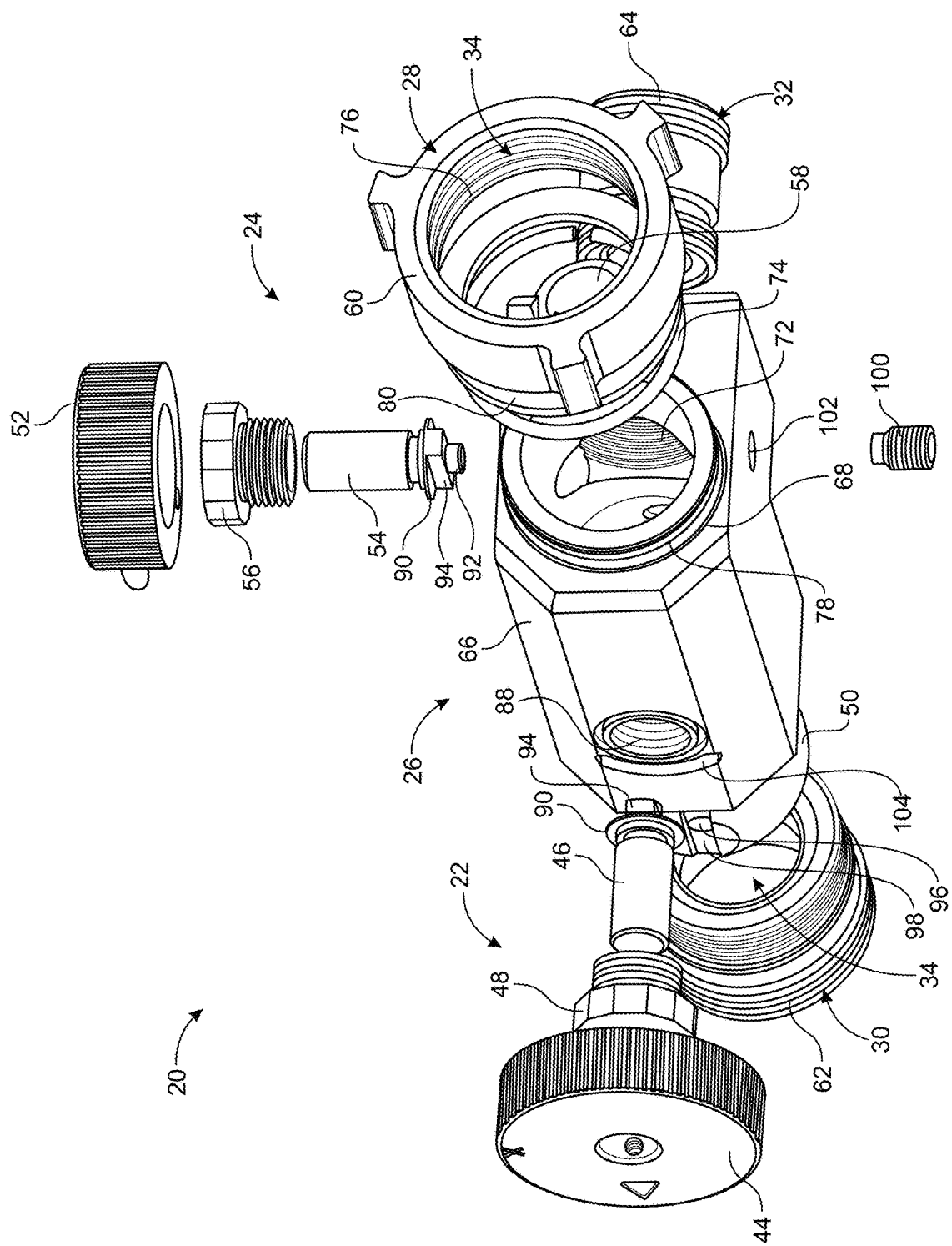
FIG. 6 is a bottom exploded perspective view of the firefighting valve assembly in FIG. 1 from the same view as FIG. 5.

Referring to FIGS. 1-2, the main inlet 28 includes a female swivel coupler 60 configured to receive and be coupled to a male end of a firefighting hose. The main outlet 30 includes a threaded male coupler 62 (alternatively referred to as a threaded insert) configured to be coupled to a female end of a firefighting hose. The branch outlet 32 also includes a threaded male coupler 64 (alternatively referred to as a threaded insert) configured to be coupled to a female end of a branch firefighting hose. It should be appreciated that the inlet 28 and the outlets 30, 32 can include any suitable combination of male and/or female couplings.

The main inlet 28 and the main outlet 30 are sized to be coupled to 1.5-inch firefighting hose, and the branch outlet 32 is sized to be coupled to 1-inch firefighting hose. It should be appreciated, however, that the inlet 28 and the outlets 30, 32 can individually be configured to be coupled to any suitable size of firefighting hose and can all be the same size, all be different sizes, or can be a combination of the same and different sizes. In some implementations, the inlet 28 and the outlets 30, 32 can have any suitable size ranging from 0.5 inches to 2.5 inches.

The main valve 22 is positioned in the valve body 26 to selectively block flow through the main passage 34. The main valve 22 moves between an open position where the main passage 34 is open and a closed position where the main passage 34 is closed. Likewise, the branch valve 24 is positioned in the valve body 26 to selectively block flow through the branch passage 36. The branch valve 24 moves between an open position where the branch passage 36 is open and a closed position where the branch passage 36 is closed.

The main inlet 28 and the main outlet 30 can be aligned with each other and/or parallel with each other. For example, a central axis 38 of the main inlet 28 and a central axis 40 of the main outlet 30 can be aligned with each other and/or positioned parallel to each other. In some implementations, such that shown in FIGS. 1-2, the main inlet 28 and the main outlet 30 are positioned concentrically relative to each other so that the axes 38, 40 are the same.

The main inlet 28 and the branch outlet 32 are not aligned with each other and/or not parallel with each other. For example, the central axis 38 of the main inlet 28 is perpendicular to a central axis 42 of the branch outlet 32 as shown in FIGS. 1-2. The description of the main inlet 28 relative to the branch outlet 32 can also be applied to the description of the main passage 34 relative to the branch passage 36.

It should be appreciated that the valve assembly 20 can include any suitable physical configuration of the main inlet 28, main outlet 30, and branch outlet 32. However, it is generally desirable for the valve assembly 20 to have a spatial profile that is similar to the firefighting hose to which it is attached to make it easy to pack, deploy, and use.

In some implementations, the valves 22, 24 operate as positive shutoffs in the closed position. This means the valves 22, 24 completely close the passages 34, 36, respectively, without any leakage. This is significant because some conventional shutoff valves are not positive shutoffs and allow leakage.

FIGS. 3-6 show exploded views of the valve assembly 20 illustrating the manner in which the components are coupled together. The valve body 26 includes a main body 66 having a sleeve 68 positioned on one end (the flow inlet), a main threaded opening 70 positioned on an opposite end, and a branch threaded opening 72 positioned perpendicular to the sleeve 68 and the main threaded opening 70.

The swivel coupler 60 is coupled to the sleeve 68 with a retaining ring 74 that fits in corresponding recesses 76, 78 in the swivel coupler 60 and the sleeve 68, respectively. A gasket 80 is positioned between the swivel coupler 60 and the sleeve 68 to prevent leaks. The threaded male coupler 62 is configured to screw into the main threaded opening 70 in the main body 66. Likewise, the threaded male coupler 64 is configured to screw into the branch threaded opening 72 in the main body 66.

The main valve 22 includes a main knob 44 (alternatively referred to as a handle), a main valve stem 46, a main valve stem bushing 48, and a main valve ball 50. The branch valve 24 includes a branch knob 52 (alternatively referred to as a handle), a branch valve stem 54, a branch valve stem bushing 56, and a branch valve ball 58.

The knobs 44, 52 are coupled to the valve stems 46, 54 with fasteners 86 such as set screws. The fasteners 86 screw into holes 82 in the side of the knobs 44, 52 and corresponding holes 84 in the valve stems 46, 54. Turning the knobs 44, 52 rotates the valve stems 46, 54. The knobs 44, 52 are textured to make it easier for a firefighter to grip them. For example, the knobs 44, 52 can have knurled finish or multi-notch design.

The valve stem bushings 48, 56 each include a threaded portion configured to be received by a corresponding threaded portion in holes 88 in the main body 66. The valve stem bushings 48, 56 have a proximal end shaped to allow a wrench or other tool to engage the proximal end to tighten the valve stem bushings 48, 56 in the holes 88.

The valve stem bushings 48, 56 have an inner bore sized to snugly slide over the valve stems 46, 54 until they reach and abut up against collars 90 located at distal ends of the valve stems 46, 54. The collars 90 prevent the valve stems 46, 54 from pulling out of the valve stem bushing 48, 56.

The distal end of each valve stem 46, 54 includes a round projection 92 and a rectangular projection 94. The side of each valve ball 50, 58 includes a round hole 96 configured to receive the round projection 92 and a rectangular shaped slot 98 configured to receive the rectangular projection 94. In this manner, the valve stems 46, 54 engage the valve balls 50, 58 so that rotating the valve stems 46, 54 cause the valve balls to rotate. The opposite side of the valve balls 50, 58 are held in place by threaded fasteners 100 extending through threaded holes 102 in the main body 66.

In some implementations, O-rings are provided to seal the valve balls 50, 58 with respect to the main body 66. For example, the main body 66 can include internal recesses in the area adjacent to the valve balls 50, 58. The recesses are configured to hold the O-rings and prevent them from being damaged due to the high pressure of the flow through the valve assembly 20.

In the implementations shown in FIG. 3-6, the distal end of the threaded male couplers 62, 64 can be tightened against the valve balls 50, 58, respectively to provide the desired amount of pressure to prevent the valves 22, 24 from leaking while still making them easy to operate. In this configuration, the male couplers 62, 64 form at least a portion of the seats for the valves 22, 24. This makes it possible to adjust the valves 22, 24 to make sure they do not leak.

Each knob 44, 52 can be turned, twisted, rotated, or moved between an open position where the corresponding passage 34, 36 is open and a closed position where the corresponding passage 34, 36 is closed. In some embodiments, each knob 44, 52 includes a setscrew or other protrusion on the bottom that moves in a corresponding slot 104 in the main body 66. The slot 104 limits the range of rotational motion of the knobs 44, 52 to approximately 90 degrees. In some embodiments, the slot 104 is a travel slot that is machined into main body 66. Each knob 44, 52 can also include markings on the outer surface indicating whether the knob 44, 52 is in the open position or the closed position.

One advantage of using the knobs 44, 52 is that the valves 22, 24 can be opened and closed without appreciably changing the spatial profile of the valve assembly 20. This makes the valve assembly 20 less susceptible to being inadvertently opened or closed like conventional valves. For example, dragging the valve assembly 20 across the ground as part of moving a wildland firefighting hose lay is less likely to inadvertently change the opened/closed statue of the valves 22, 24.

In some implementations, the valve assembly 20 can be part of a hose pack, which is a portable apparatus that a firefighter can use to carry firefighting hoses. The hose pack can include a lightweight frame or board, shoulder harness, or the like. Straps are used to contain the hose or the hose itself may serve as straps if configured properly. Usually jigs are used to fold or wind the hose for proper fit. The hose is dispensed from the container as the loose end is pulled off, or the hose-carrying individual walks away with the loose end anchored. If the hose is in a roll, it is rolled out. Rapid deployment is the main objective.

Figure 7:
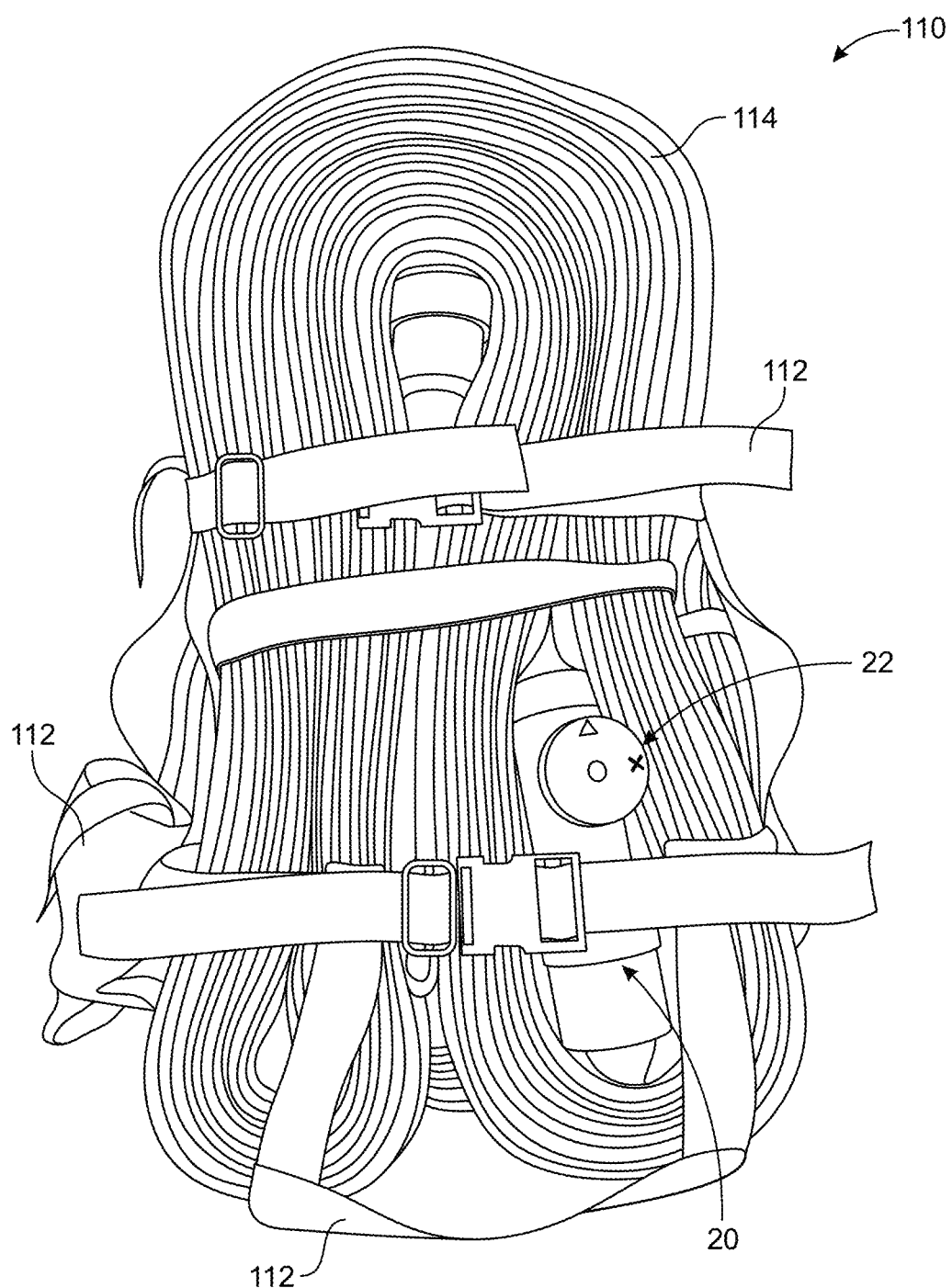
FIG. 7 is a top perspective view of a one implementation of a hose pack. One implementation of the firefighting valve assembly is coupled to the male end of a firefighting hose.
Figure 8:
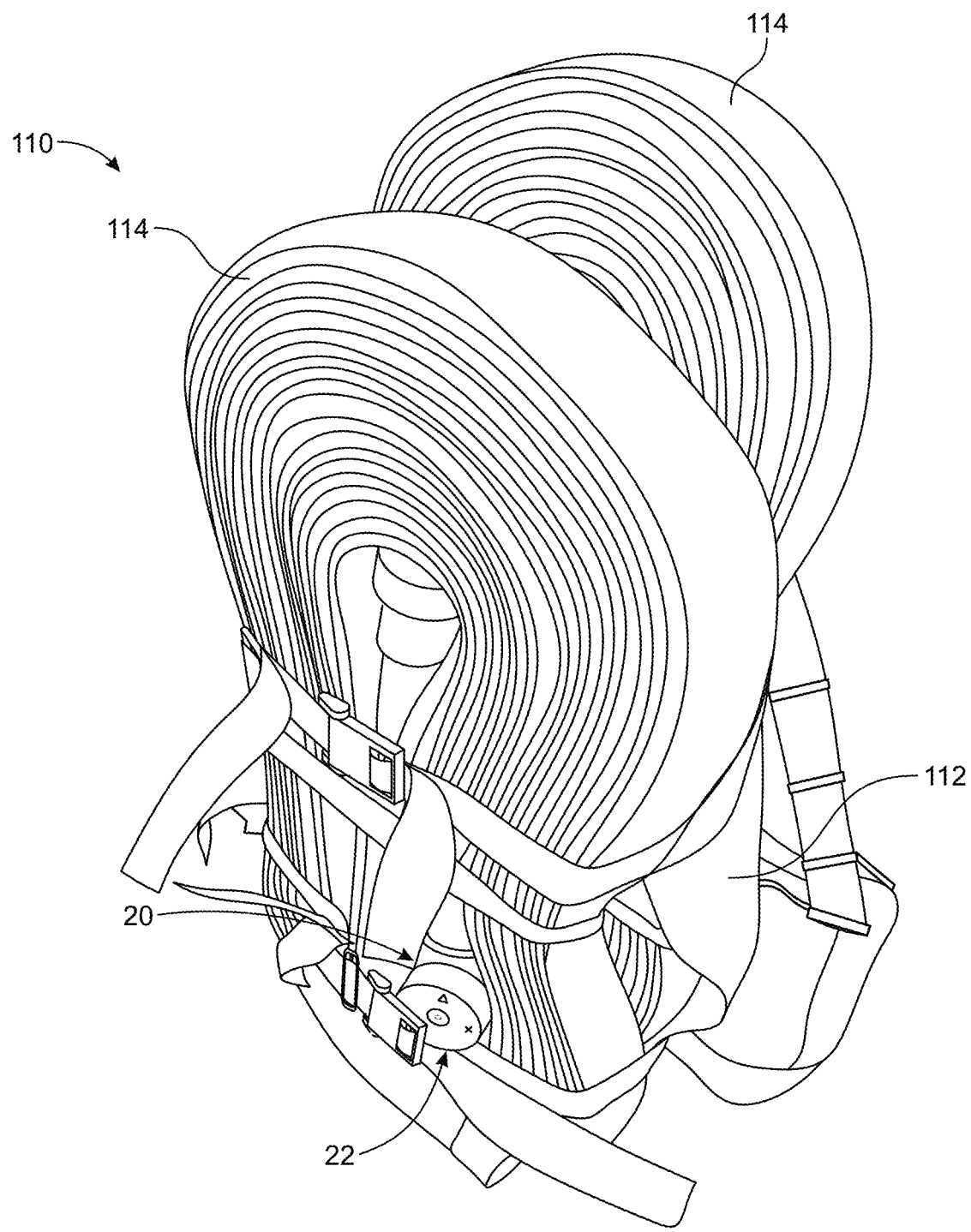
FIG. 8 is a perspective view of the hose pack in FIG. 7.
Figure 9:
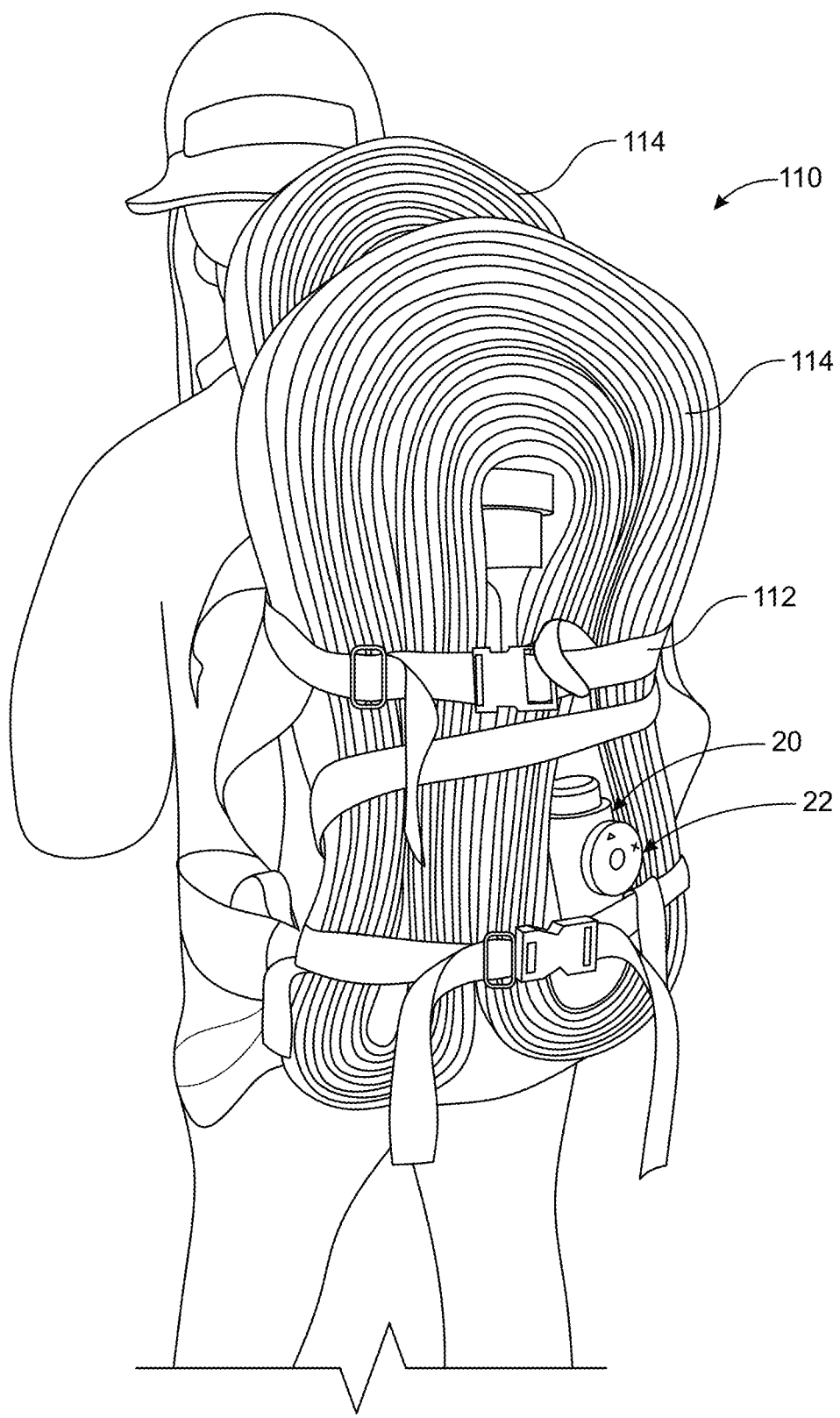
FIG. 9 is a perspective view of the hose pack in FIG. 7 worn by a wildland firefighter.

Referring to FIGS. 7-9, the firefighting valve assembly 20 is shown as part of a wildland firefighting hose pack 110. The hose pack 110 includes a shoulder harness 112, a firefighting hose 114, and the valve assembly 20 coupled to one end (male end) of the firefighting hose 114. The hose pack 110 can include a single firefighting hose 114 and corresponding valve assembly 20 or can include multiple firefighting hoses 114 and corresponding valve assemblies 20.

The firefighting hose pack 110 can be configured to hold various configurations of the firefighting hose 114 and valve assembly 20. For example, the hose pack 110 can be configured as a forester hose pack, Rhode Island hose pack, Canadian style hose pack, Gansner hose pack, modified Gansner hose pack, Travis hose pack, *ponderosa* hose pack, and the like.

Figure 10:
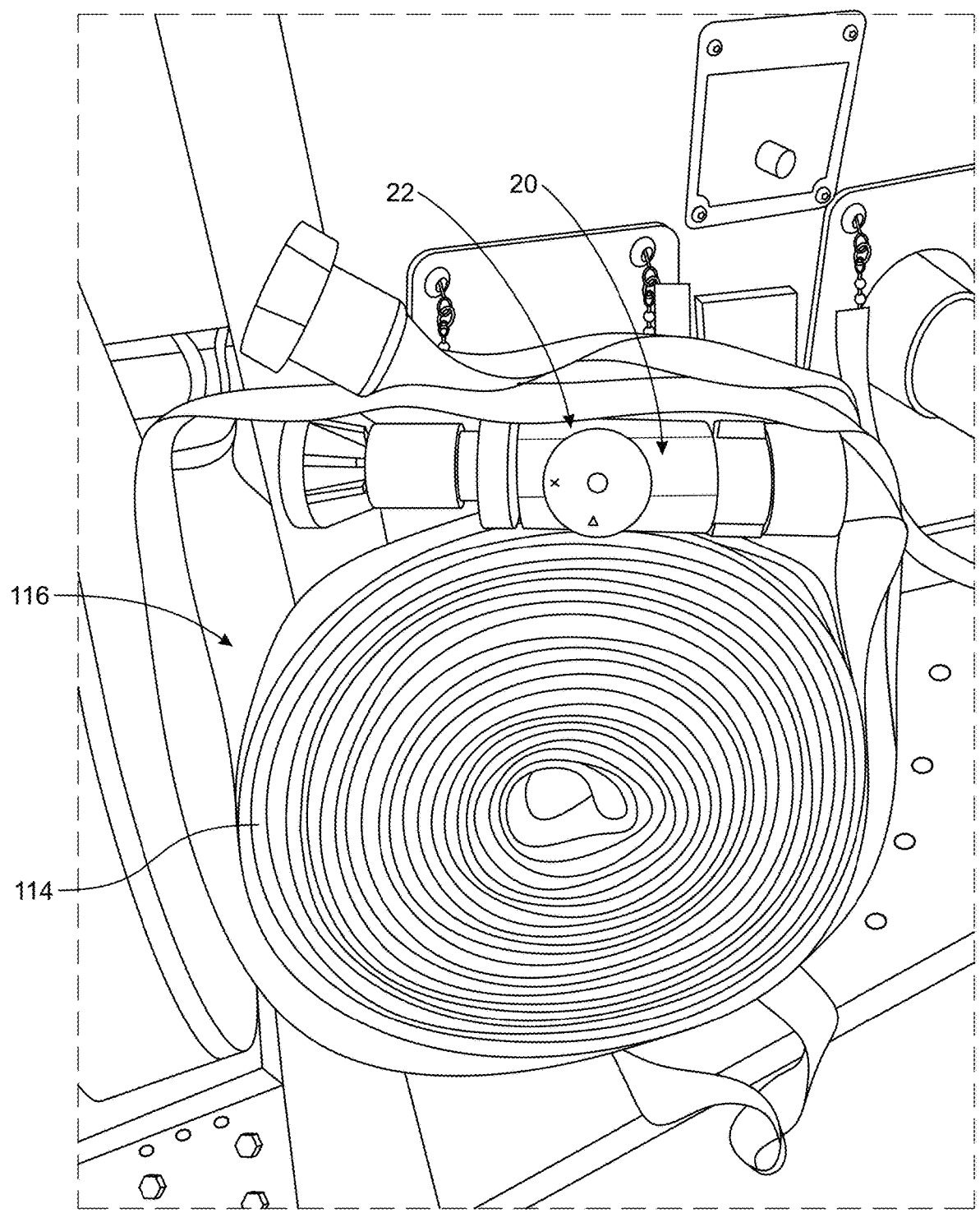
FIG. 10 is a perspective view of a starter roll firefighting hose on a fire engine. The starter roll includes one implementation of the firefighting valve assembly coupled to the male end of the hose.

Referring to FIG. 10, the firefighting valve assembly 20 is shown coupled to a firefighting hose 114 that is part of a starter roll 116 on a fire apparatus such as a fire truck. The starter roll can be used as the first segment of a firefighting hose lay. The other segments can be those carried by firefighters in a hose pack 110 or the like.

It should be appreciated that the valve assembly 20 can be used in a number of ways to deploy firefighting hose at the scene of a fire. In one implementation, the valve assembly 20 can be used to deploy a wildland firefighting hose lay. This is done by extending a first firefighting hose from a water or fire-retardant source towards or along an edge of a fire. For example, this can include deploying a starter roll from a fire truck. A first valve assembly 20 is coupled to a distal end of the first firefighting hose with the valves 22, 24 in the closed position.

After deploying the firefighting hose, a second firefighting hose is coupled to the first valve assembly 20. The second firefighting hose includes a second valve assembly 20 with the valves 22, 24 in the closed position. The valve 22 in the first valve assembly 20 is opened to charge the second firefighting hose. The second firefighting hose is extended, and the process is repeated with as many firefighting hoses as are necessary to successfully fight the fire. Branch line hoses can be connected and disconnected as desired to allow water or fire retardant to be provided laterally to burned areas and the like.

Figure 11:
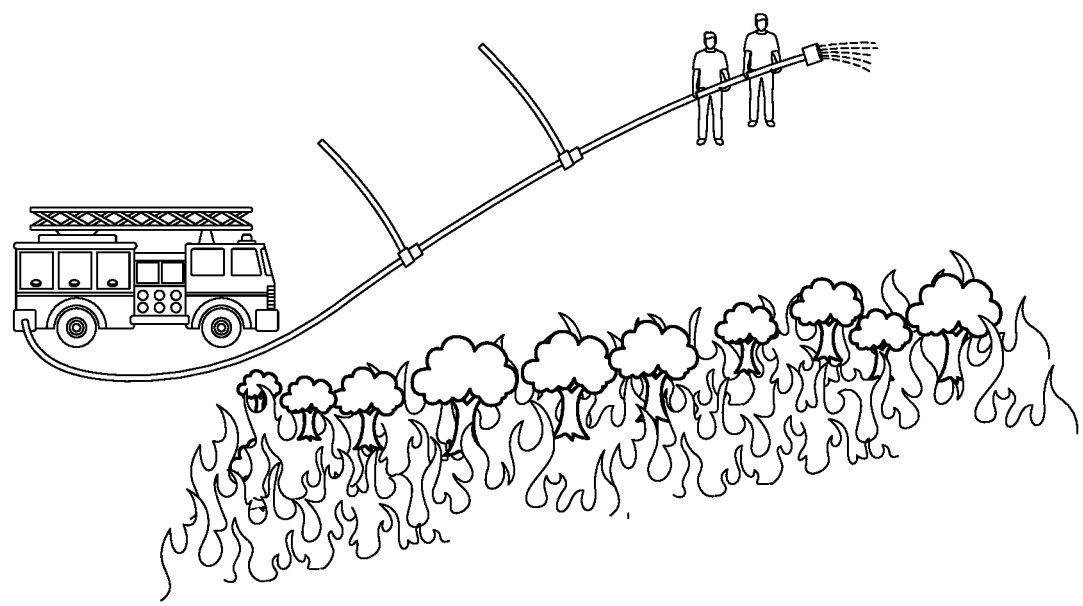
FIG. 11 is a diagram showing one implementation of a method of deploying a progressive hose lay to fight a fire.

Referring to FIG. 11, another implementation of a method is shown for deploying firefighting hose at the scene of a fire. In this implementation, as the hose lay advances along the edge of the fire, firefighter 1 (FF1) can shut off the flow of water using the valve assembly 20. Both firefighters can work alongside one another advancing additional sections of hose, making the hose lay advance faster and safer. In addition, the valve assembly 20 remains in the hose lay at each connection (approximately 100 feet, for example) to provide the ability to shut off the hose lay to replace failed sections and the like.

Illustrative Implementations

The following is a description of various implementations of the disclosed subject matter. Each implementation may include one or more of the various features, characteristics, or advantages of the disclosed subject matter. The implementations are intended to illustrate a few aspects of the disclosed subject matter and should not be considered a comprehensive or exhaustive description of all possible implementations.

P1. A firefighting valve assembly comprising: a valve body comprising: an inlet; an outlet; and a passage extending between the inlet and the outlet; and a valve coupled to the valve body, the valve including a knob movable between an open position where the passage is open and a closed position where the passage is closed.

P2. The firefighting valve assembly of paragraph P1 wherein the knob is rotatable on an axis that is not parallel to the passage.

P3. The firefighting valve assembly of paragraph P2 wherein the axis is perpendicular to the passage.

P4. The firefighting valve assembly of paragraph P1 wherein the closed position of the knob completely closes the passage with no leaks.

P5. The firefighting valve assembly of paragraph P1 wherein the knob has a circular shape.

P6. The firefighting valve assembly of paragraph P1 wherein a ratio of the diameter of the knob to the diameter of the passage is no more than 2.

P7. The firefighting valve assembly of paragraph P1 wherein a ratio of the diameter of the knob to the diameter of the passage is no more than 1.75.

P8. The firefighting valve assembly of paragraph P1 wherein a ratio of the diameter of the knob to the diameter of the passage is no more than 1.5.

P9. The firefighting valve assembly of paragraph P1 wherein moving the knob between the open position and the closed position does not appreciably change the spatial profile of the firefighting valve assembly.

P10. The firefighting valve assembly of paragraph P1 wherein the inlet and the outlet are aligned with each other.

P11. The firefighting valve assembly of paragraph P1 wherein a central axis of the inlet and a central axis of the outlet are parallel to each other.

P12. The firefighting valve assembly of paragraph P1 wherein a central axis of the inlet and a central axis of the outlet are aligned with each other.

P13. A wildland firefighting hose lay comprising: a firefighting hose; and the firefighting valve assembly of paragraph P1 coupled to one end of the firefighting hose.

P14. The wildland firefighting hose lay of paragraph P13 wherein the firefighting hose is a first firefighting hose, the wildland firefighting hose lay comprising a second firefighting hose coupled to the firefighting valve assembly.

P15. A wildland firefighting hose pack comprising: a shoulder harness; a firefighting hose positioned in the shoulder harness; and the firefighting valve assembly of paragraph P1 coupled to one end of the firefighting hose.

P16. A wildland firefighting hose pack comprising: a shoulder harness; a first firefighting hose positioned in the shoulder harness; a second firefighting hose positioned in the shoulder harness; a first firefighting valve assembly of paragraph P1 coupled to one end of the first firefighting hose; and a second firefighting valve assembly of paragraph P1 coupled to one end of the second firefighting hose;

P17. A method for deploying a wildland firefighting hose lay comprising: extending a first firefighting hose along an edge of a fire, the first firefighting hose including a first firefighting valve assembly of paragraph P1 coupled to a distal end of the first firefighting hose with the knob of the first firefighting valve assembly in the closed position; coupling a proximal end of a second firefighting hose to the first firefighting valve assembly, the second firefighting hose including a second firefighting valve assembly of paragraph P1 coupled to a distal end of the second firefighting hose with the knob of the second firefighting valve assembly in the closed position; moving the knob of the first firefighting valve assembly from the closed position to the open position; and extending the second firefighting hose along the edge of the fire.

P18. The method for deploying a wildland firefighting hose lay comprising: extending a first firefighting hose along an edge of a fire, the first firefighting hose including a first firefighting valve assembly of paragraph P1 coupled to a distal end of the first firefighting hose with the knob of the first firefighting valve assembly in the closed position; coupling a proximal end of a second firefighting hose to the first firefighting valve assembly, the second firefighting hose including a second firefighting valve assembly of paragraph P1 coupled to a distal end of the second firefighting hose with the knob of the second firefighting valve assembly in the closed position; moving the knob of the first firefighting valve assembly from the closed position to the open position; extending the second firefighting hose along the edge of the fire; coupling a proximal end of a third firefighting hose to the second firefighting valve assembly, the third firefighting hose including a third firefighting valve assembly of paragraph P1 coupled to a distal end of the third firefighting hose with the knob of the third firefighting valve assembly in the closed position; moving the knob of the second firefighting valve assembly from the closed position to the open position; and extending the third firefighting hose along the edge of the fire.

P19. A firefighting valve assembly comprising: a valve body comprising: an inlet; an outlet; and a passage extending between the inlet and the outlet; and a valve coupled to the valve body, the valve being movable between an open position where the passage is open and a closed position where the passage is closed; wherein moving the valve between the open position and the closed position does not appreciably change the spatial profile of the firefighting valve assembly.

P20. The firefighting valve assembly of paragraph P19 wherein the valve is rotatable on an axis that is not parallel to the passage.

P21. The firefighting valve assembly of paragraph P20 wherein the axis is perpendicular to the passage.

P22. The firefighting valve assembly of paragraph P19 wherein the closed position of the valve completely closes the passage with no leaks.

P23. The firefighting valve assembly of paragraph P19 comprising a handle movable between an open position where the passage is open and a closed position where the passage is closed.

P24. The firefighting valve assembly of paragraph P19 comprising a knob movable between an open position where the passage is open and a closed position where the passage is closed.

P25. The firefighting valve assembly of paragraph P24 wherein the knob has a circular shape.

P26. The firefighting valve assembly of paragraph P24 wherein a ratio of the diameter of the knob to the diameter of the passage is no more than 2.

P27. The firefighting valve assembly of paragraph P24 wherein a ratio of the diameter of the knob to the diameter of the passage is no more than 1.75.

P28. The firefighting valve assembly of paragraph P24 wherein a ratio of the diameter of the knob to the diameter of the passage is no more than 1.5.

P29. The firefighting valve assembly of paragraph P19 wherein a central axis of the inlet and a central axis of the outlet are not perpendicular to each other.

P30. The firefighting valve assembly of paragraph P19 wherein a central axis of the inlet and a central axis of the outlet are aligned with each other.

P31. A wildland firefighting hose lay comprising: a firefighting hose; and the firefighting valve assembly of paragraph P19 coupled to one end of the firefighting hose.

P32. The wildland firefighting hose lay of paragraph P31 wherein the firefighting hose is a first firefighting hose, the wildland firefighting hose lay comprising a second firefighting hose coupled to the firefighting valve assembly.

P33. A wildland firefighting hose pack comprising: a shoulder harness; a firefighting hose positioned in the shoulder harness; and the firefighting valve assembly of paragraph P19 coupled to one end of the firefighting hose.

P34. A wildland firefighting hose pack comprising: a shoulder harness; a first firefighting hose positioned in the shoulder harness; a second firefighting hose positioned in the shoulder harness; a first firefighting valve assembly of paragraph P19 coupled to one end of the first firefighting hose; and a second firefighting valve assembly of paragraph P19 coupled to one end of the second firefighting hose;

P35. A method for deploying a wildland firefighting hose lay comprising: extending a first firefighting hose along an edge of a fire, the first firefighting hose including a first firefighting valve assembly of paragraph P19 coupled to a distal end of the first firefighting hose with the valve of the first firefighting valve assembly in the closed position; coupling a proximal end of a second firefighting hose to the first firefighting valve assembly, the second firefighting hose including a second firefighting valve assembly of paragraph P19 coupled to a distal end of the second firefighting hose with the valve of the second firefighting valve assembly in the closed position; moving the valve of the first firefighting valve assembly from the closed position to the open position; and extending the second firefighting hose along the edge of the fire.

P36. The method for deploying a wildland firefighting hose lay comprising: extending a first firefighting hose along an edge of a fire, the first firefighting hose including a first firefighting valve assembly of paragraph P19 coupled to a distal end of the first firefighting hose with the valve of the first firefighting valve assembly in the closed position; coupling a proximal end of a second firefighting hose to the first firefighting valve assembly, the second firefighting hose including a second firefighting valve assembly of paragraph P19 coupled to a distal end of the second firefighting hose with the valve of the second firefighting valve assembly in the closed position; moving the valve of the first firefighting valve assembly from the closed position to the open position; extending the second firefighting hose along the edge of the fire; coupling a proximal end of a third firefighting hose to the second firefighting valve assembly, the third firefighting hose including a third firefighting valve assembly of paragraph P19 coupled to a distal end of the third firefighting hose with the valve of the third firefighting valve assembly in the closed position; moving the valve of the second firefighting valve assembly from the closed position to the open position; and extending the third firefighting hose along the edge of the fire.

P37. A firefighting valve assembly comprising: a valve body comprising: a main inlet; a main outlet; a branch outlet; a main passage extending between the main inlet and the main outlet; and a branch passage extending between the main passage and the branch outlet; a main valve coupled to the valve body, the main valve including a main knob movable between an open position where the main passage is open and a closed position where the main passage is closed; and a branch valve coupled to the valve body, the branch valve being movable between an open position where the branch passage is open and a closed position where the branch passage is closed.

P38. The firefighting valve assembly of paragraph P37 wherein the main knob is rotatable on an axis that is not parallel to the main passage.

P39. The firefighting valve assembly of paragraph P38 wherein the axis is perpendicular to the main passage.

P40. The firefighting valve assembly of paragraph P37 wherein the main knob has a circular shape.

P41. The firefighting valve assembly of paragraph P37 wherein the main knob is rotatable on a first axis and the branch valve is rotatable on a second axis, and wherein the first axis and the second axis are not parallel to each other.

P42. The firefighting valve assembly of paragraph P41 wherein the first axis and the second axis are perpendicular to each other.

P43. The firefighting valve assembly of paragraph P37 wherein the closed position of the main knob completely closes the main passage with no leaks.

P44. The firefighting valve assembly of paragraph P37 comprising a branch handle movable between an open position where the branch passage is open and a closed position where the branch passage is closed.

P45. The firefighting valve assembly of paragraph P44 wherein the main knob is positioned on one side of the valve body and the branch handle is positioned on another side of the valve body.

P46. The firefighting valve assembly of paragraph P37 comprising a branch knob movable between an open position where the branch passage is open and a closed position where the branch passage is closed.

P47. The firefighting valve assembly of paragraph P46 wherein a ratio of the diameter of the branch knob to the diameter of the branch passage is no more than 2.

P48. The firefighting valve assembly of paragraph P46 wherein the branch knob is rotatable on an axis that is not parallel to the branch passage.

P49. The firefighting valve assembly of paragraph P48 wherein the axis is perpendicular to the branch passage.

P50. The firefighting valve assembly of paragraph P37 wherein a ratio of the diameter of the main knob to the diameter of the main passage is no more than 2.

P51. The firefighting valve assembly of paragraph P37 wherein a ratio of the diameter of the main knob to the diameter of the main passage is no more than 1.75.

P52. The firefighting valve assembly of paragraph P37 wherein a ratio of the diameter of the main knob to the diameter of the main passage is no more than 1.5.

P53. The firefighting valve assembly of paragraph P37 wherein moving the main knob between the open position and the closed position does not appreciably change the spatial profile of the firefighting valve assembly.

P54. The firefighting valve assembly of paragraph P37 wherein moving the branch valve between the open position and the closed position does not appreciably change the spatial profile of the firefighting valve assembly.

P55. The firefighting valve assembly of paragraph P37 wherein the main inlet and the main outlet are aligned with each other.

P56. The firefighting valve assembly of paragraph P37 wherein a central axis of the main inlet and a central axis of the main outlet are parallel to each other.

P57. The firefighting valve assembly of paragraph P37 wherein a central axis of the main inlet and a central axis of the main outlet are aligned with each other.

P58. The firefighting valve assembly of paragraph P37 wherein the main outlet and the branch outlet are positioned perpendicular to each other.

P59. A wildland firefighting hose lay comprising: a firefighting hose; and the firefighting valve assembly of paragraph P37 coupled to one end of the firefighting hose.

P60. The wildland firefighting hose lay of paragraph P59 wherein the firefighting hose is a first firefighting hose, the wildland firefighting hose lay comprising a second firefighting hose coupled to the firefighting valve assembly.

P61. A wildland firefighting hose pack comprising: a shoulder harness; a firefighting hose positioned in the shoulder harness; and the firefighting valve assembly of paragraph P37 coupled to one end of the firefighting hose.

P62. A wildland firefighting hose pack comprising: a shoulder harness; a first firefighting hose positioned in the shoulder harness; a second firefighting hose positioned in the shoulder harness; a first firefighting valve assembly of paragraph P37 coupled to one end of the first firefighting hose; and a second firefighting valve assembly of paragraph P37 coupled to one end of the second firefighting hose;

P63. A method for deploying a wildland firefighting hose lay comprising: extending a first firefighting hose along an edge of a fire, the first firefighting hose including a first firefighting valve assembly of paragraph P37 coupled to a distal end of the first firefighting hose with the main knob of the first firefighting valve assembly in the closed position; coupling a proximal end of a second firefighting hose to the first firefighting valve assembly, the second firefighting hose including a second firefighting valve assembly of paragraph P37 coupled to a distal end of the second firefighting hose with the main knob of the second firefighting valve assembly in the closed position; moving the main knob of the first firefighting valve assembly from the closed position to the open position; and extending the second firefighting hose along the edge of the fire.

P64. The method for deploying a wildland firefighting hose lay comprising: extending a first firefighting hose along an edge of a fire, the first firefighting hose including a first firefighting valve assembly of paragraph P37 coupled to a distal end of the first firefighting hose with the main knob of the first firefighting valve assembly in the closed position; coupling a proximal end of a second firefighting hose to the first firefighting valve assembly, the second firefighting hose including a second firefighting valve assembly of paragraph P37 coupled to a distal end of the second firefighting hose with the main knob of the second firefighting valve assembly in the closed position; moving the main knob of the first firefighting valve assembly from the closed position to the open position; extending the second firefighting hose along the edge of the fire; coupling a proximal end of a third firefighting hose to the second firefighting valve assembly, the third firefighting hose including a third firefighting valve assembly of paragraph P37 coupled to a distal end of the third firefighting hose with the main knob of the third firefighting valve assembly in the closed position; moving the main knob of the second firefighting valve assembly from the closed position to the open position; and extending the third firefighting hose along the edge of the fire.

P65. A firefighting valve assembly comprising: a valve body comprising: a main inlet; a main outlet positioned parallel to the main inlet; a branch outlet; a main passage extending between the main inlet and the main outlet; and a branch passage extending between the main passage and the branch outlet; a main valve coupled to the valve body, the main valve being movable between an open position where the main passage is open and a closed position where the main passage is closed; and a branch valve coupled to the valve body, the branch valve being movable between an open position where the branch passage is open and a closed position where the branch passage is closed.

P66. The firefighting valve assembly of paragraph P65 wherein the main valve is rotatable on an axis that is not parallel to the main passage.

P67. The firefighting valve assembly of paragraph P66 wherein the axis is perpendicular to the main passage.

P68. The firefighting valve assembly of paragraph P65 wherein the main valve is rotatable on a first axis and the branch valve is rotatable on a second axis, and wherein the first axis and the second axis are not parallel to each other.

P69. The firefighting valve assembly of paragraph P68 wherein the first axis and the second axis are perpendicular to each other.

P70. The firefighting valve assembly of paragraph P65 wherein the closed position of the main valve completely closes the main passage with no leaks.

P71. The firefighting valve assembly of paragraph P65 comprising a main handle movable between an open position where the main passage is open and a closed position where the main passage is closed.

P72. The firefighting valve assembly of paragraph P65 comprising a main knob movable between an open position where the main passage is open and a closed position where the main passage is closed.

P73. The firefighting valve assembly of paragraph P72 wherein the main knob has a circular shape.

P74. The firefighting valve assembly of paragraph P72 wherein a ratio of the diameter of the main knob to the diameter of the main passage is no more than 2.

P75. The firefighting valve assembly of paragraph P72 wherein a ratio of the diameter of the main knob to the diameter of the main passage is no more than 1.75.

P76. The firefighting valve assembly of paragraph P72 wherein a ratio of the diameter of the main knob to the diameter of the main passage is no more than 1.5.

P77. The firefighting valve assembly of paragraph P65 comprising a branch handle movable between an open position where the branch passage is open and a closed position where the branch passage is closed.

P78. The firefighting valve assembly of paragraph P65 comprising a branch knob movable between an open position where the branch passage is open and a closed position where the branch passage is closed.

P79. The firefighting valve assembly of paragraph P78 wherein the branch knob has a circular shape.

P80. The firefighting valve assembly of paragraph P78 wherein a ratio of the diameter of the branch knob to the diameter of the branch passage is no more than 2.

P81. The firefighting valve assembly of paragraph P78 wherein the branch knob is rotatable on an axis that is not parallel to the branch passage.

P82. The firefighting valve assembly of paragraph P81 wherein the axis is perpendicular to the branch passage.

P83. The firefighting valve assembly of paragraph P65 wherein moving the main valve between the open position and the closed position does not appreciably change the spatial profile of the firefighting valve assembly.

P84. The firefighting valve assembly of paragraph P65 wherein moving the branch valve between the open position and the closed position does not appreciably change the spatial profile of the firefighting valve assembly.

P85. The firefighting valve assembly of paragraph P65 wherein a central axis of the main inlet and a central axis of the main outlet are aligned with each other.

P86. The firefighting valve assembly of paragraph P65 wherein the main outlet and the branch outlet are positioned perpendicular to each other.

P87. A wildland firefighting hose lay comprising: a firefighting hose; and the firefighting valve assembly of paragraph P65 coupled to one end of the firefighting hose.

P88. The wildland firefighting hose lay of paragraph P87 wherein the firefighting hose is a first firefighting hose, the wildland firefighting hose lay comprising a second firefighting hose coupled to the firefighting valve assembly.

P89. A wildland firefighting hose pack comprising: a shoulder harness; a firefighting hose positioned in the shoulder harness; and the firefighting valve assembly of paragraph P65 coupled to one end of the firefighting hose.

P90. A wildland firefighting hose pack comprising: a shoulder harness; a first firefighting hose positioned in the shoulder harness; a second firefighting hose positioned in the shoulder harness; a first firefighting valve assembly of paragraph P65 coupled to one end of the first firefighting hose; and a second firefighting valve assembly of paragraph P65 coupled to one end of the second firefighting hose;

P91. A method for deploying a wildland firefighting hose lay comprising: extending a first firefighting hose along an edge of a fire, the first firefighting hose including a first firefighting valve assembly of paragraph P65 coupled to a distal end of the first firefighting hose with the main valve of the first firefighting valve assembly in the closed position; coupling a proximal end of a second firefighting hose to the first firefighting valve assembly, the second firefighting hose including a second firefighting valve assembly of paragraph P65 coupled to a distal end of the second firefighting hose with the main valve of the second firefighting valve assembly in the closed position; moving the main valve of the first firefighting valve assembly from the closed position to the open position; and extending the second firefighting hose along the edge of the fire.

P92. The method for deploying a wildland firefighting hose lay comprising: extending a first firefighting hose along an edge of a fire, the first firefighting hose including a first firefighting valve assembly of paragraph P65 coupled to a distal end of the first firefighting hose with the main valve of the first firefighting valve assembly in the closed position; coupling a proximal end of a second firefighting hose to the first firefighting valve assembly, the second firefighting hose including a second firefighting valve assembly of paragraph P65 coupled to a distal end of the second firefighting hose with the main valve of the second firefighting valve assembly in the closed position; moving the main valve of the first firefighting valve assembly from the closed position to the open position; extending the second firefighting hose along the edge of the fire; coupling a proximal end of a third firefighting hose to the second firefighting valve assembly, the third firefighting hose including a third firefighting valve assembly of paragraph P65 coupled to a distal end of the third firefighting hose with the main valve of the third firefighting valve assembly in the closed position; moving the main valve of the second firefighting valve assembly from the closed position to the open position; and extending the third firefighting hose along the edge of the fire.

P93. A firefighting valve assembly comprising: a valve body comprising: a main inlet; a main outlet; a branch outlet; a main passage extending between the main inlet and the main outlet; and a branch passage extending between the main passage and the branch outlet; a main valve coupled to the valve body, the main valve being movable between an open position where the main passage is open and a closed position where the main passage is closed; and a branch valve coupled to the valve body, the branch valve being movable between an open position where the branch passage is open and a closed position where the branch passage is closed; wherein moving the main valve between the open position and the closed position does not appreciably change the spatial profile of the firefighting valve assembly.

P94. The firefighting valve assembly of paragraph P93 wherein moving the branch valve between the open position and the closed position does not appreciably change the spatial profile of the firefighting valve assembly.

P95. The firefighting valve assembly of paragraph P93 wherein the main valve is rotatable on an axis that is not parallel to the main passage.

P96. The firefighting valve assembly of paragraph P95 wherein the axis is perpendicular to the main passage.

P97. The firefighting valve assembly of paragraph P93 wherein the main valve is rotatable on a first axis and the branch valve is rotatable on a second axis, and wherein the first axis and the second axis are not parallel to each other.

P98. The firefighting valve assembly of paragraph P97 wherein the first axis and the second axis are perpendicular to each other.

P99. The firefighting valve assembly of paragraph P93 wherein the closed position of the main valve completely closes the main passage with no leaks.

P100. The firefighting valve assembly of paragraph P93 comprising a main handle movable between an open position where the main passage is open and a closed position where the main passage is closed.

P101. The firefighting valve assembly of paragraph P93 comprising a main knob movable between an open position where the main passage is open and a closed position where the main passage is closed.

P102. The firefighting valve assembly of paragraph P101 wherein the main knob has a circular shape.

P103. The firefighting valve assembly of paragraph P101 wherein a ratio of the diameter of the main knob to the diameter of the main passage is no more than 2.

P104. The firefighting valve assembly of paragraph P101 wherein a ratio of the diameter of the main knob to the diameter of the main passage is no more than 1.75.

P105. The firefighting valve assembly of paragraph P101 wherein a ratio of the diameter of the main knob to the diameter of the main passage is no more than 1.5.

P106. The firefighting valve assembly of paragraph P93 comprising a branch handle movable between an open position where the branch passage is open and a closed position where the branch passage is closed.

P107. The firefighting valve assembly of paragraph P93 comprising a branch knob movable between an open position where the branch passage is open and a closed position where the branch passage is closed.

P108. The firefighting valve assembly of paragraph P107 wherein the branch knob has a circular shape.

P109. The firefighting valve assembly of paragraph P107 wherein a ratio of the diameter of the branch knob to the diameter of the branch passage is no more than 2.

P110. The firefighting valve assembly of paragraph P107 wherein the branch knob is rotatable on an axis that is not parallel to the branch passage.

P111. The firefighting valve assembly of paragraph P110 wherein the axis is perpendicular to the branch passage.

P112. The firefighting valve assembly of paragraph P93 wherein a central axis of the main inlet and a central axis of the main outlet are not perpendicular to each other.

P113. The firefighting valve assembly of paragraph P93 wherein a central axis of the main inlet and a central axis of the main outlet are aligned and/or parallel with each other.

P114. The firefighting valve assembly of paragraph P93 wherein the main outlet and the branch outlet are positioned perpendicular to each other.

P115. A wildland firefighting hose lay comprising: a firefighting hose; and the firefighting valve assembly of paragraph P93 coupled to one end of the firefighting hose.

P116. The wildland firefighting hose lay of paragraph P115 wherein the firefighting hose is a first firefighting hose, the wildland firefighting hose lay comprising a second firefighting hose coupled to the firefighting valve assembly.

P117. A wildland firefighting hose pack comprising: a shoulder harness; a firefighting hose positioned in the shoulder harness; and the firefighting valve assembly of paragraph P93 coupled to one end of the firefighting hose.

P118. A wildland firefighting hose pack comprising: a shoulder harness; a first firefighting hose positioned in the shoulder harness; a second firefighting hose positioned in the shoulder harness; a first firefighting valve assembly of paragraph P93 coupled to one end of the first firefighting hose; and a second firefighting valve assembly of paragraph P93 coupled to one end of the second firefighting hose;

P119. A method for deploying a wildland firefighting hose lay comprising: extending a first firefighting hose along an edge of a fire, the first firefighting hose including a first firefighting valve assembly of paragraph P93 coupled to a distal end of the first firefighting hose with the main valve of the first firefighting valve assembly in the closed position; coupling a proximal end of a second firefighting hose to the first firefighting valve assembly, the second firefighting hose including a second firefighting valve assembly of paragraph P93 coupled to a distal end of the second firefighting hose with the main valve of the second firefighting valve assembly in the closed position; moving the main valve of the first firefighting valve assembly from the closed position to the open position; and extending the second firefighting hose along the edge of the fire.

P120. The method for deploying a wildland firefighting hose lay comprising: extending a first firefighting hose along an edge of a fire, the first firefighting hose including a first firefighting valve assembly of paragraph P93 coupled to a distal end of the first firefighting hose with the main valve of the first firefighting valve assembly in the closed position; coupling a proximal end of a second firefighting hose to the first firefighting valve assembly, the second firefighting hose including a second firefighting valve assembly of paragraph P93 coupled to a distal end of the second firefighting hose with the main valve of the second firefighting valve assembly in the closed position; moving the main valve of the first firefighting valve assembly from the closed position to the open position; extending the second firefighting hose along the edge of the fire; coupling a proximal end of a third firefighting hose to the second firefighting valve assembly, the third firefighting hose including a third firefighting valve assembly of paragraph P93 coupled to a distal end of the third firefighting hose with the main valve of the third firefighting valve assembly in the closed position; moving the main valve of the second firefighting valve assembly from the closed position to the open position; and extending the third firefighting hose along the edge of the fire.

General Terminology and Interpretative Conventions

Any methods described in the claims or specification should not be interpreted to require the steps to be performed in a specific order unless expressly stated otherwise. Also, the methods should be interpreted to provide support to perform the recited steps in any order unless expressly stated otherwise.

Certain features described in the context of separate implementations can also be implemented in combination in a single implementation. Conversely, various features that are described in the context of a single implementation can also be implemented in multiple implementations separately or in any suitable subcombination. Moreover, although features may be described above in certain combinations and even initially claimed as such, one or more features from a claimed combination can be excised from the combination, and the claimed combination may be directed to a subcombination or variation of a subcombination.

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items.

The terms have, having, include, and including should be interpreted to be synonymous with the terms comprise and comprising. The use of these terms should also be understood as disclosing and providing support for narrower alternative implementations where these terms are replaced by "consisting" or "consisting essentially of."

Unless otherwise indicated, all numbers or expressions, such as those expressing dimensions, physical characteristics, and the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and by applying ordinary rounding techniques.

All disclosed ranges are to be understood to encompass and provide support for claims that recite any subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth), which values can be expressed alone or as a minimum value (e.g., at least 5.8) or a maximum value (e.g., no more than 9.9994).

All disclosed numerical values are to be understood as being variable from 0-100% in either direction and thus provide support for claims that recite such values (either alone or as a minimum or a maximum—e.g., at least <value> or no more than <value>) or any ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range expressed individually (e.g., 15.2), as a minimum value (e.g., at least 4.3), or as a maximum value (e.g., no more than 12.4).

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

The subject matter recited in the claims is not coextensive with and should not be interpreted to be coextensive with any implementation, feature, or combination of features described or illustrated in this document. This is true even if only a single implementation of the feature or combination of features is illustrated and described.

Joining or Fastening Terminology and Interpretative Conventions

The term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

The term "coupled" includes joining that is permanent in nature or releasable and/or removable in nature. Permanent joining refers to joining the components together in a manner that is not capable of being reversed or returned to the original condition. Releasable joining refers to joining the components together in a manner that is capable of being reversed or returned to the original condition.

Releasable joining can be further categorized based on the difficulty of releasing the components and/or whether the components are released as part of their ordinary operation and/or use. Readily or easily releasable joining refers to joining that can be readily, easily, and/or promptly released with little or no difficulty or effort. Difficult or hard to release joining refers to joining that is difficult, hard, or arduous to release and/or requires substantial effort to release. The joining can be released or intended to be released as part of the ordinary operation and/or use of the components or only in extraordinary situations and/or circumstances. In the latter case, the joining can be intended to remain joined for a long, indefinite period until the extraordinary circumstances arise.

It should be appreciated that the components can be joined together using any type of fastening method and/or fastener. The fastening method refers to the way the components are joined. A fastener is generally a separate component used in a mechanical fastening method to mechanically join the components together. A list of examples of fastening methods and/or fasteners are given below. The list is divided according to whether the fastening method and/or fastener is generally permanent, readily released, or difficult to release.

Examples of permanent fastening methods include welding, soldering, brazing, crimping, riveting, stapling, stitching, some types of nailing, some types of adhering, and some types of cementing. Examples of permanent fasteners include some types of nails, some types of dowel pins, most types of rivets, most types of staples, stitches, most types of structural ties, and toggle bolts.

Examples of readily releasable fastening methods include clamping, pinning, clipping, latching, clasping, buttoning, zipping, buckling, and tying. Examples of readily releasable fasteners include snap fasteners, retainer rings, circlips, split pin, linchpins, R-pins, clevis fasteners, cotter pins, latches, hook and loop fasteners (VELCRO), hook and eye fasteners, push pins, clips, clasps, clamps, zip ties, zippers, buttons, buckles, split pin fasteners, and/or conformat fasteners.

Examples of difficult to release fastening methods include bolting, screwing, most types of threaded fastening, and some types of nailing. Examples of difficult to release fasteners include bolts, screws, most types of threaded fasteners, some types of nails, some types of dowel pins, a few types of rivets, a few types of structural ties.

It should be appreciated that the fastening methods and fasteners are categorized above based on their most common configurations and/or applications. The fastening methods and fasteners can fall into other categories or multiple categories depending on their specific configurations and/or applications. For example, rope, string, wire, cable, chain, and the like can be permanent, readily releasable, or difficult to release depending on the application.

Drawing Related Terminology and Interpretative Conventions

The drawings are intended to illustrate implementations that are both drawn to scale and/or not drawn to scale. This means the drawings can be interpreted, for example, as showing: (a) everything drawn to scale, (b) nothing drawn to scale, or (c) one or more features drawn to scale and one or more features not drawn to scale. Accordingly, the drawings can serve to provide support to recite the sizes, proportions, and/or other dimensions of any of the illustrated features either alone or relative to each other. Furthermore, all such sizes, proportions, and/or other dimensions are to be understood as being variable from 0-100% in either direction and thus provide support for claims that recite such values or any and all ranges or subranges that can be formed by such values.

Spatial or directional terms, such as "left," "right," "front," "back," and the like, relate to the subject matter as it is shown in the drawings and/or how it is commonly oriented during manufacture, use, or the like. However, it is to be understood that the described subject matter may assume various alternative orientations and, accordingly, such terms are not to be considered as limiting.

INCORPORATION BY REFERENCE

The entire content of each document listed below is incorporated by reference into this document (the documents below are collectively referred to as the "incorporated documents"). If the same term is used in both this document and one or more of the incorporated documents, then it should be interpreted to have the broadest meaning imparted by any one or combination of these sources unless the term has been explicitly defined to have a different meaning in this document. If there is an inconsistency between any incorporated document and this document, then this document shall govern. The incorporated subject matter should not be used to limit or narrow the scope of the explicitly recited or depicted subject matter.

U.S. Prov. App. No. 62/748,971, titled "Firefighting Valve, Hose, Pack, and Method of Use," filed on 22 Oct. 2018.

What is claimed is:

1. A firefighting valve assembly comprising:
a valve body having a first end opposite a second end and further comprising:
   a fluid inlet penetrating the first end;
   a fluid outlet penetrating the second end;
   a first fluid passage extending through and between the fluid inlet and the fluid outlet;
   a second fluid passage extending from the first fluid passage to penetrate a side of the valve body intermediate the first end and the second end of the valve body;
   a first valve coupled to the valve body in communication with the first fluid passage, the first valve including a first knob movable between a first knob open position where the first passage is open and a first knob closed position where the first passage is closed;
   a second valve coupled to the valve body in communication with the second fluid passage, the second valve including a second knob movable between a second knob open position where the second passage is open and a second knob closed position where the second passage is closed;
a sleeve projecting from the first end, an external surface of the sleeve having a sleeve recess;
a swivel hose coupler disposed-on the sleeve, an internal surface of the swivel hose coupler having a coupler recess: and
a retainer ring disposed in the coupler and sleeve recesses, the retainer ring swivelingly connecting the swivel hose coupler to the sleeve.

2. The firefighting valve assembly of claim 1 wherein the first knob has a circular shape and a first protrusion and the valve body defines a first slot adjacent the first knob, the first protrusion disposed in the first slot to prevent rotation of the first knob other than between the first-knob open position and the first-knob closed position.

3. The firefighting valve assembly of claim 1 wherein the second knob has a circular shape and a second protrusion and the valve body defines a second slot adjacent the second knob, the second protrusion disposed in the second slot to prevent rotation of the second knob other than between the second-knob open position and the second-knob closed position.

4. The firefighting valve assembly of claim 1 wherein a first ratio of the diameter of the first knob to the diameter of the first passage is no more than 2.

5. The firefighting valve assembly of claim 1 wherein: (i) moving the first knob between the first knob open position and the first knob closed position does not appreciably change the spatial profile of the firefighting valve assembly; and (ii) moving the second knob between the second knob open position and the second knob closed position does not appreciably change the spatial profile of the firefighting valve assembly.

6. The firefighting valve assembly of claim 1 wherein (i) a central axis of the fluid inlet and a central axis of the fluid outlet are coaxial; and (ii) the second fluid passage has a central axis transverse to a central axis of the first fluid passage.

7. A firefighting hose lay comprising:
a firefighting hose having a proximal end opposite a distal end; and
the swivel hose coupler of the firefighting valve assembly of claim 1 coupled to the distal end of the firefighting hose.

8. The firefighting hose lay of claim 7 wherein the firefighting hose is a first firefighting hose, the firefighting hose lay comprising a second firefighting hose coupled to the second end of the firefighting valve assembly.

9. A firefighting hose pack comprising:
a shoulder harness;
a firefighting hose positioned in the shoulder harness having a proximal end and distal end; and
the firefighting valve assembly of claim 1 with the swivel hose coupler coupled to the distal end of the firefighting hose.

10. The firefighting valve assembly of claim 1 wherein the first knob has a knurled outer periphery.

11. The firefighting valve assembly of claim 2 wherein the first knob has a knurled outer periphery.

12. The firefighting valve assembly of claim 3 wherein the second knob has a knurled outer periphery.

13. The firefighting valve assembly of claim 4 wherein the first knob has a knurled outer periphery.

14. The firefighting valve assembly of claim 10 wherein the second knob has a knurled outer periphery.

15. The firefighting valve assembly of claim 14 wherein:
(i) moving the first knob between the first knob open position and the first knob closed position does not appreciably change the spatial profile of the firefighting valve assembly; and (ii) moving the second knob between the second knob open position and the second knob closed position does not appreciably change the spatial profile of the firefighting valve assembly.

16. The firefighting valve assembly of claim 13 wherein (i) a central axis of the fluid inlet and a central axis of the fluid outlet are coaxial; and (ii) the second fluid passage has a central axis transverse to a central axis of the first fluid passage.

17. A firefighting valve assembly comprising:
a valve body having a first end opposite a second end and further comprising:
a fluid inlet penetrating the first end;
a fluid outlet penetrating the second end; and
a first fluid passage extending through and between the fluid inlet and the fluid outlet;
a second fluid passage extending from the first fluid passage to penetrate a side of the valve body intermediate the first end and the second end of the valve body;
a first valve coupled to the valve body in communication with the first fluid passage, the first valve including a first knob movable between a first knob open position where the first passage is open and a first knob closed position where the first passage is closed; and
a second valve coupled to the valve body in communication with the second fluid passage, the second valve including a second knob movable between a second knob open position where the second passage is open and a second knob closed position where the second passage is closed;
wherein the first knob has a circular shape and a first protrusion, and the valve body defines a first slot, the first protrusion being disposed in the first slot to restrict rotation of the first knob to between the first-knob open position and the first-knob closed position, and the second knob has a circular shape and a second protrusion, and the valve body defines a second slot, the second protrusion disposed in the second slot to restrict rotation of the second knob to between the second-knob open position and the second-knob closed position.

18. The firefighting valve assembly of claim 16 wherein the swivel hose coupler has a female 1.5 inch National Standard Thread, and wherein the firefighting valve assembly further comprises a sleeve disposed in the second fluid passage, the sleeve having a male 1.0 inch National Standard Thread.

19. The firefighting valve assembly of claim 1 wherein the first knob and the second knob each are disk shaped.

20. The firefighting valve assembly of claim 18 wherein the first knob and the second knob each are disk shaped and have a knurled outer periphery.

21. A firefighting valve assembly comprising a valve body having a first end opposite a second end and further comprising:
a fluid inlet penetrating the first end;
a fluid outlet penetrating the second end;
a first fluid passage extending through and between the fluid inlet and the fluid outlet;

a second fluid passage extending from the first fluid passage to penetrate a side of the valve body intermediate the first end and the second end of the valve body;

a first valve coupled to the valve body in communication with the first fluid passage, the first valve including a first circularly-shaped knob movable between a first knob open position where the first passage is open and a first knob closed position where the first passage is closed, the valve body defining a first slot adjacent the first knob, the first knob having a first protrusion disposed in the first slot to prevent rotation of the first knob other than between the first-knob open position and the first-knob closed position;

a second valve coupled to the valve body in communication with the second fluid passage, the second valve including a second knob movable between a second knob open position where the second passage is open and a second knob closed position where the second passage is closed; and a swivel hose coupler mounted to, and being rotatable about, the first end.

\* \* \* \* \*